Sept. 5, 1961 C. J. KRAMIS 2,999,053
RECOVERY OF TRIMETHYLAMINE BY EXTRACTIVE DISTILLATION
Filed Feb. 18, 1959
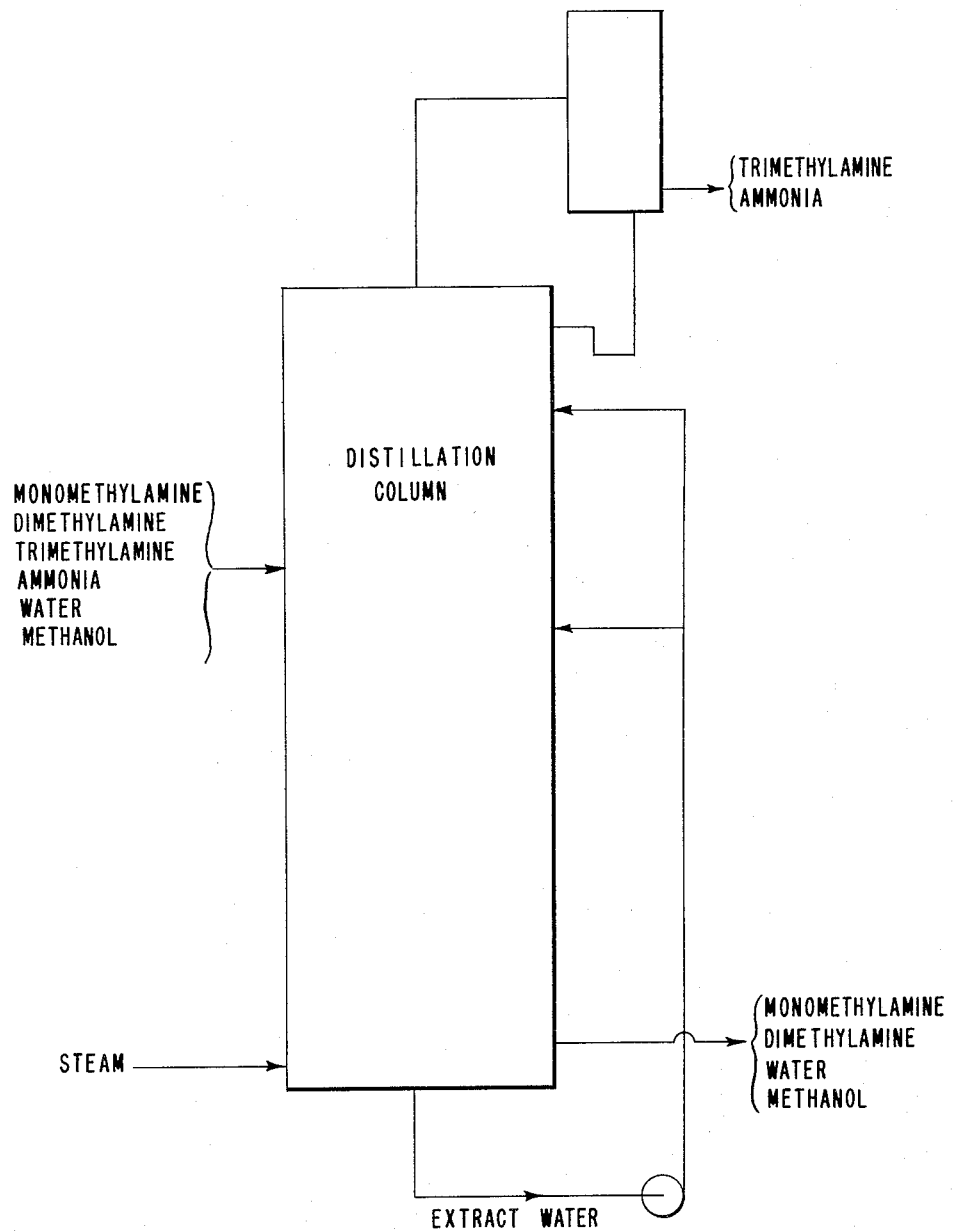
INVENTOR
CHARLES J. KRAMIS
BY John E. Griffiths
ATTORNEY

United States Patent Office 2,999,053
Patented Sept. 5, 1961

2,999,053
RECOVERY OF TRIMETHYLAMINE BY
EXTRACTIVE DISTILLATION
Charles J. Kramis, Houston, Tex., assignor to E. I. du
Pont de Nemours and Company, Wilmington, Del., a
corporation of Delaware
Filed Feb. 18, 1959, Ser. No. 794,092
3 Claims. (Cl. 202—39.5)

This invention relates to extractive distillation processes for continuously removing trimethylamine and ammonia from other methylamines in methylamine mixtures containing ammonia. More particularly, the invention is directed to a continuous distillation process for effecting the separation in a single column of trimethylamine and ammonia from dimethylamine in the presence of monomethylamine, water and methanol.

In the manufacture of methylamines by the catalytic reaction of methanol with ammonia, the gases coming from the contact zone contain the three methylamines (trimethylamine, dimethylamine and monomethylamine), water and some unreacted ammonia and methanol. These gases are referred to in the parlance of the art as "converter crude."

It has been known in the prior art to remove trimethylamine from such a converter crude reaction mixture by adding sufficient additional ammonia to carry off overhead all of the trimethylamine in the form of a constant boiling mixture with ammonia. See for example, Olin U.S. Patent 2,388,217. In the Olin process, there is no suggestion of the introduction of extract water in any way.

Further, attempts to utilize the Olin process to effect the essentially complete removal of both ammonia and trimethylamine from the mono- and dimethylamine rich streams obtained by the process here being described have proven completely impractical. This is so because the ammonia-trimethylamine azeotrope composition can be obtained only when at least one of these materials is present in large excess as a result of the small difference in boiling point between $NH_3$ and the subject azeotrope (less than 1° C. at 200 to 300 p.s.i.g.). This means that essentially complete TMA removal from the mono- and dimethylamine rich streams can only be obtained by addition of sufficient trimethylamine-free ammonia far enough below the trimethylamine feed point to the fractionating device to obtain the excess ammonia and the countercurrent stripping necessary to force essentially all of the trimethylamine out overhead as the azeotrope. This obviously is not practical since at least one additional fractionating device would be required to provide the trimethylamine-free ammonia.

In prior art processes, including the Olin process, the separation and purification of the individual methylamines from converter crude requires substantial distillation apparatus. Frequently a still train is employed. To operate such apparatus, large quantities of steam or electricity are consumed.

I have now discovered a process wherein distillation equipment and power consumption can be kept to a minimum without sacrificing quality and yield of amines. The gist of my invention is the removal of the major constituents of the converter crude, which major constituents include trimethylamine and ammonia, in the first column of the still train by means of an extractive distillation with water.

Since the principal object of the present invention is to remove trimethylamine and ammonia overhead from the column, while forwarding dimethylamine, monomethylamine and other components out the bottom of the column, it is completely unexpected that a water extractive distillation process would be operable. For example, it is well known that, of the four principal nitrogen-containing water-soluble components in the converter crude, the most soluble is ammonia, followed in order of decreasing solubility by monomethylamine, dimethylamine and, lastly trimethylamine. Surprisingly, according to the present invention, I have discovered a critical set of process conditions whereby the most water-soluble component (ammonia) together with the least water-soluble component (trimethylamine) are removed together in an overhead stream from the water extractive distillation column, while the two intermediately water-soluble components (monomethylamine and dimethylamine) are carried out the bottom of the column in water solution.

In practicing the processes of the present invention, a methylamine converter crude mixture containing from 30 to 70% of trimethylamine, from 14 to 18% of dimethylamine, from 4 to 8% of monomethylamine, and from 10 to 25% of ammonia, together in aqueous solution with whatever methanol may be present as a result of the manufacturing process, is introduced continuously into a heated (closed or open steam) distillation column through an opening near the center of the column. By center of the column is meant an inlet feed located at an intermediate point vertically in the column, i.e. into the central one-third portion of the column. On a total weight basis, normally the amount of water present in the converter crude being fed to the column will not exceed about 20%, and is preferably between about 5 and 15% by weight. A minor amount of methanol present in the crude mixture will not deleteriously affect the methylamine separation when carried out in accordance with this invention.

Concurrently, water is fed continuously into the column at two places: (1) through an opening near the top of the distillation column and (2) through an opening near the center of the column but below the opening through which the converter crude is introduced into the column. These features are important.

By the expression "near the top" of the column is meant a location within about the upper one-eighth of the total vertical distance of the column, such as on about the forty-fifth, forty-sixth or forty-seventh plates of a fifty-plate fractionating column, or at about the fifty-second, fifty-fifth, or thereabouts, plate of a sixty-plate fractionating column. The plates between the top extract water feed point and the top of the column are required to reduce the water content of the overhead vapor to the desired low level. Normally this will require 5 to 10% of the fractionating capacity of the unit.

The water feed entering near the center of the column but below the converter crude feed point must be far enough below the crude feed point to permit essentially complete ammonia removal to have been accomplished since any ammonia left in the liquid entering the zone of "mid column" water addition will be carried downward with the mono- and dimethylamine. Normally this will require that 10 to 20% of the available fractionating capacity of the unit be located between the converter crude and lower extract water feed points. It has also been found that ability to control the temperatures of these two extract water streams independently is desirable for attainment of maximum effectiveness of the process.

It is essential that heat be provided at the bottom of the column to provide a source of boilup. As will be understood in the art, this can be provided by any conventional means, such as gas-fired heat, etc. It is preferred that open or closed steam be used but it will be understood that the process of this invention is not limited to such means and, where open or closed steam is recited herein, equivalent means can be used without departing from the scope of this invention.

The column is operated at a pressure of from about 180 to about 300 per square inch gauge (p.s.i.g.), preferably in the range of 220 to 260 p.s.i.g. At these pressures, water can be used as the condenser cooling medium. While pressure does have some effect on the operation of the column, it is minor. The pressure limitations in this process are set solely to permit condensing the overhead vapors with cooling water. For any given run in carrying out the process of this invention, the pressure will preferably be maintained constant, and the other process conditions set at their critical values for that particular pressure.

Vapors are withdrawn from the top of the column. These vapors are composed predominantly, as is stated above, or trimethylamine and ammonia, with only a minor amount of monomethylamine. The quantity of dimethylamine in the overhead vapors is less than 5% by weight. Likewise, the water content of the vapors is less than 5% by weight.

From the bottom of the column are continuously withdrawn dimethylamine, monomethylamine, and less than 5% by weight trimethylamine, together with the other components such as ammonia and methanol that may be present, as an aqueous solution or optionally as a liquid or vapor side stream near the bottom of the column. This bottom stream will contain all of the water introduced into the column except for the small amount passing off in the vapor overhead stream. In the event dimethylamine and monomethylamine are removed as a side stream, say, at the fifth plate from the bottom in a fifty-plate column, stripping of low boilers from water occurs in this section, yielding a bottoms stream low enough in amine content to permit recycle of the bottoms stream as "extract" water.

In order to remove as vapors overhead the most water-soluble nitrogen-containing component (ammonia) together with the least water-soluble nitrogen-containing component (trimethylamine), while at the same time removing the two intermediately water-soluble components (monomethylamine and dimethylamine) from the bottom, according to the process of this invention, it has been found that the temperature of two portions of the distillation column must be maintained within certain critical limits for successful operation. At a pressure of 255 p.s.i.g., the temperature immediately below the top extract water feed point should be maintained within the range from 101° C. to 104° C. The temperature immediately below the lower extract water feed point should be maintained within the range from 130° C. to 160° C.

Temperatures in other parts of the column are, in general, not critical insofar as operation of this process is concerned since their value is determined by converter crude composition and mechanism used to obtain extract water, for example: Overhead and side stream compositions will obviously vary with crude composition resulting in changing temperatures with all other variables unchanged; the use of open or closed steam will greatly alter side stream water content and thus change temperature at the side stream draw off. Actual temperature control for any given equipment arrangement and crude composition is obtained as follows:

(a) Control boil-up in section above top extract water feed inlet and thus reflux ratio, degree of dehydration and temperatures in this section by control of the temperature of the top extract water injection point. This is done by cooling or heating as may be required. (See also c2 below.)

(b) Temperature of the section between the two extract water feed points (characterized by the temperature immediately below the upper extract water feed point) is controlled primarily by the "amount" of water entering the upper feed point but will also be affected to a lesser degree by the "temperature" of the water entering the lower extract water feed point.

(c) Sufficient steam must be added to the bottom of the column to accomplish the following functions:

(c1) Vaporize the ammonia and trimethylamine content of the crude being fed to the column.

(c2) Together with heat content of upper extract water feed provide adequate reflux for dehydration in the top section (upper extract water feed can provide only a portion of the total heat requirement).

(c3) If mono- and dimethylamine are withdrawn as a vapor side stream to permit bottoms recycle as extract water, steam should be adequate to supply the heat content of the vapor side stream and provide adequate stripping in the bottom section to reduce amine content of the extract water to the desired low level.

As can be seen, the temperature employed in the upper, more critical zone of this distillation column can vary over only a narrow range. It will be understood that the temperatures specified in the examples below apply only when the stated pressures, compositions and other conditions are employed.

From the above discussion, it will be evident that the following factors also contribute to the successful operation of the water extractive distillation column:

(1) Feed of converter crude into the middle of the column.

(2) Feed of water into the middle of the column but below the inlet for the converter crude.

(3) Feed of water near but not at the top of the column.

(4) Feed of steam into the bottom of the column.

(5) Withdrawal of trimethylamine and ammonia as vapor from the top of the column.

(6) Withdrawal of dimethylamine and monomethylamine plus other components from the bottom of the column.

(7) Temperature control.

(8) Pressure control.

As will now be explained, the above process conditions are manipulated, each within their critical range, to attain the unexpected result of the desired separation.

The purpose of the selection of the critical ranges for the above variables is to establish and maintain a critical water concentration throughout the column. This water concentration in the column will be different in the different sections of the column, but must be adequate to reduce the relative volatility of monomethylamine and dimethylamine with respect to ammonia and trimethylamine enough to permit the desired separation. Too much water will carry ammonia down with the dimethylamine and monomethylamine while too little water will carry trimethylamine down with the monomethylamine and dimethylamine.

In accordance with this aim, then, the water concentration in the section of the column below the lower inlet for extract water is maintained considerably higher than in the section immediately below the upper extract water inlet. In this manner, very little ammonia passes below the lower inlet for the water fed into the column. Putting this in other words, the low water concentration between the two extract water feed points is not enough to drag the ammonia downward while the greater volatility of the ammonia makes the ammonia go upward.

In the section below the lower extract water inlet, the relatively large quantities of water act as a barrier which the trimethylamine cannot pass. Thus, trimethylamine concentration is very high just above the lower inlet for the water. Yet, this factor is not sufficient, and it is necessary that the water feed be added to the top of the column also in order to cause the trimethylamine to proceed upward and out overhead. Restated, the dimethylamine and monomethylamine can be carried downward through this high trimethylamine concentration immediately above the lower water inlet only with the assistance of this small, critical upper stream of water.

The conditions of the process of this invention can be defined in terms of the critical water concentration in the column by stating that, based on the total weight of all the components in the respective portion of the column, (1) water will be present in the vapor space in an amount of at least 20% by volume below the lower extract water inlet of the column, (2) while the amount of water present in the vapor space in the zone immediately below the upper extract water feed point should not exceed about 5% by volume. The water concentration in the vapor phase in the section of the column between the two extract water feed points has been found particularly critical, with possible operation over a range of 0.5 to 10 mol percent, and preferably within the range from 1.5 to 4 mol percent, based on the total material present in that portion of the column of water in the vapor phase.

These necessary operational conditions are maintained by the following essential process features of this invention:

(1) Maintain the converter crude input and the overhead takeoff substantially constant.

(2) Maintain the temperature and pressure within the limits recited above.

(3) Add extract water in the locations recited above in amounts having the following relationship to each other and to other operating variables:

(a) For most efficient operation (lowest steam consumption), extract water obtained by recycle from the bottom of the column should be used with minimum cooling.

(b) When extract water streams are not cooled (200 to 210° C. at 255 pounds per square inch gauge operating pressure) and when using a converter crude of the following approximate composition;

| | Weight percent |
|---|---|
| Ammonia | 10 to 25 |
| Monomethylamine | 4 to 8 |
| Dimethylamine | 14 to 18 |
| Trimethylamine | 30 to 70 |
| Water | 10 to 25 | the following relationship will exist:

Use 0.7–1.5 pounds of steam, 0.2–0.3 pound of extract water to upper feed point and 0.7 to 1.5 pounds of extract water to lower feed point for each pound of converter crude. The ranges specified are required to take into account the needs of any particular situation as dictated by the crude composition, equipment fractionating capacity, process design, etc.

The bottoms from the water extractive distillation column are fed continuously to a second distillation column wherein the dimethylamine and monomethylamine, together with any trimethylamine and ammonia left over, are dehydrated. In this dehydration column, water is removed from the bottom, while any unconverted methanol is removed as a side stream, and the overhead stream contains predominantly dimethylamine and monomethylamine with minor amounts of trimethylamine and ammonia. This overhead stream is fed in turn to a third distillation column. The water collected at the bottom stream from the dehydrator column can be used again as "extract water" in the first column.

In the third distillation column, a separation of the dimethylamine from the monomethylamine is effected. The distillate that is withdrawn from the third column is composed essentially of monomethylamine. Ammonia and any trimethylamine present in the feed to this third column may be present in the distillate as impurities. Substantially pure dimethylamine will be withdrawn from the bottom of the column.

The processes of the present invention can be carried out in any suitable apparatus capable of withstanding the pressures and the temperatures employed. There can be used, for instance, plate-type rectifying columns of the type conventionally used in commercial distillation operations. Such rectifying columns are divided into a series of distillation zones and are adapted to permit the flow of distilled vapors from each zone upward into contact with liquid being distilled in the next preceding zone. Liquid from each distillation zone flows countercurrent to the ascending distilled vapors into the next lower or following distillation zone. Packed rectifying towers and columns can also be used for the extractive distillation as well as for the subsequent dehydration operation.

It will be understood that the efficiency and quality of amine separation obtained according to this invention will depend upon such factors as the number of plates in the column, precise location of feed points, type of equipment, etc. In commercial practice, control of this operation is maintained by regulation of overhead takeoff rate with a fixed extract water, steam, and amine feed rates. Thus, for any given set of extract water, steam and amine feed rates, the overhead takeoff rate on the column can be adjusted, as will readily be apparent to one skilled in the art, to give the desired results, in accordance with the teachings set forth herein. This rate can be determined by an analysis of the second column overhead stream for trimethylamine and ammonia.

The purity of the monomethylamine and the dimethylamine will depend upon such factors as the design of the distillation columns, the production rate, and the composition of the converter crude amine mixture. Substantially pure dimethylamine, that is, dimethylamine having less than 1% impurity, and substantially pure monomethylamine can be obtained as a result of the above processes.

An illustrative diagram of the present invention is shown in the accompanying schematic drawing wherein the indicated descriptions are self-explanatory.

In order to more fully understand the present invention reference should be had to the following illustrative examples:

*Example 1*

A mixture of methylamines containing about 50 percent by weight trimethylamine, about 15 percent dimethylamine, about 7 percent monomethylamine, about 15 percent ammonia, about 12 percent of water, and 1 percent methanol is fed continuously to the 40th plate of a sixty-plate fractionating column operating at 255 pounds per square inch gauge at a rate of about 1000 pounds per hour.

Extract water at 200° C. is introduced concurrently at the 55th plate of the column at a rate of about 250 pounds per hour and to the 30th plate at 1200 pounds per hour. The extract water used at the start-up is fresh, but as the operation continues water from the "bottoms" of a second column may be used. Open steam is fed to the bottom of the column at 1000 pounds per hour.

The extractive distillation column, referred to hereafter as column No. 1, is operated at 255 p.s.i.g. and at an overhead temperature of from about 75 to 85° C. At plate 50, the temperature ranges from about 101 to 104° C. The temperature at plate 28 ranges from 130 to 150° C. The temperature of the system at the bottom of the column No. 1 is about 175° C.

The vapors constituting the overhead stream from column No. 1 are removed at a rate of 710 pounds per hour. These vapors are composed by weight of about 70% trimethylamine, 22% ammonia, 2% monomethylamine, about 2% dimethylamine, and less than 5% water.

An analysis by weight (on a water-free basis) of the material in the bottom section of column No. 1 is as follows:

| | Percent |
|---|---|
| Dimethylamine | 64 |
| Monomethylamine | 31 |
| Ammonia | 1.0 |
| Trimethylamine | 0.2 |
| Methanol | 4.8 |

The "bottoms" from column No. 1 (2500 pounds per hour of 8% aqueous amine solution) are fed continuously to the middle of a second distillation column operated at about 210 p.s.i.g. and at a temperature of 90° C. at the top of the column. The "bottoms" of this second column contains essentially pure water. The minor amount of methanol present in the feed is removed as a side stream.

The overhead stream from column No. 2 containing about 67% dimethylamine, and 33% monomethylamine is removed at a rate of 200 pounds per hour and fed continuously to a third column operating at about 180 p.s.i.g. Separation of the dimethylamine from the monomethylamine is effected in the third column in a conventional manner.

*Example 2*

Example 1 is repeated except that the draw off feed to the second column is an 18% aqueous vapor side stream, at approximately 150° C., from the 5th plate from the bottom. The bottoms stream now at 200 to 210° C. and containing less than 1% total amines is used to supply the extract water requirements specified in Example 1 above.

This application is a continuation-in-part of my copending application Serial No. 536,291, filed September 23, 1955, and now abandoned.

I claim:

1. A continuous extractive distillation process for removing trimethylamine in the presence of ammonia from a crude mixture containing from 30 to 70% of trimethylamine, 14 to 18% of dimethylamine, 4 to 8% of monomethylamine, 10 to 25% of ammonia and 10 to 25% of water, which comprises the steps of continuously feeding said crude mixture to a heated distillation column at an intermediate point thereof; concurrently feeding extract water continuously into said column through two inlets, one inlet positioned near the top of said column and the other inlet positioned near the center of said column but below said intermediate point of feed of said crude mixture, said feeding of extract water through said one inlet and said other inlet being in an amount of 0.2 to 0.3 pound and 0.7 to 1.5 pounds respectively, for each one pound of said crude mixture being fed into said column; concurrently feeding open or closed steam continuously into the bottom of said column in an amount of 0.7 to 1.5 pounds for each one pound of said crude mixture being fed into said column; operating said column at a pressure of from 180 to 300 p.s.i.g; maintaining the temperature within said column such that water below said other inlet in said column will be present in the vapor phase in an amount of at least 20% by volume, and such that water immediately below said one inlet in said column will be present in the vapor phase in an amount of less than 5% by volume, and such that water in the portion of said column between said one inlet and said other inlet in said column will be present in the vapor phase in an amount between 0.5 to 10 mol percent based on the total material present in said portion of said column; withdrawing as vapors from the top of said column trimethylamine and ammonia along with less than 5% by weight of each of monomethylamine and dimethylamine based on the trimethylamine withdrawn; and withdrawing from the bottom of said column aqueous monomethylamine and dimethylamine along with minor amounts of ammonia, and less than 5% by weight trimethylamine based on the dimethylamine withdrawn.

2. A process as set forth in claim 1 wherein said pressure is 220 to 260 p.s.i.g.

3. A process as set forth in claim 1 wherein said mol percent is 1.5 to 4.

References Cited in the file of this patent

UNITED STATES PATENTS

| | | |
|---|---|---|
| 2,045,929 | Swallen | June 30, 1936 |
| 2,388,217 | Olin | Oct. 30, 1945 |
| 2,547,064 | Tyerman | Apr. 3, 1951 |
| 2,570,291 | Tyerman | Oct. 9, 1951 |
| 2,729,600 | Beach | Jan. 3, 1956 |
| 2,848,386 | Kramis | Aug. 19, 1958 |